(12) United States Patent
Wang et al.

(10) Patent No.: US 11,039,433 B2
(45) Date of Patent: Jun. 15, 2021

(54) CHANNEL FORMATS WITH FLEXIBLE DURATION IN WIRELESS COMMUNICATIONS

(71) Applicant: QUALCOMM Incorporated, San Diego, CA (US)

(72) Inventors: Renqiu Wang, San Diego, CA (US); Yi Huang, San Diego, CA (US); Hao Xu, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 15/969,477

(22) Filed: May 2, 2018

(65) Prior Publication Data

US 2018/0324777 A1 Nov. 8, 2018

Related U.S. Application Data

(60) Provisional application No. 62/502,421, filed on May 5, 2017.

(51) Int. Cl.
*H04W 72/04* (2009.01)
*H04W 72/12* (2009.01)
(Continued)

(52) U.S. Cl.
CPC .......... *H04W 72/044* (2013.01); *H04B 1/713* (2013.01); *H04J 13/16* (2013.01);
(Continued)

(58) Field of Classification Search
CPC ........... H04W 72/0413; H04W 72/044; H04W 72/1268; H04B 1/713; H04L 5/0016;
(Continued)

(56) References Cited

U.S. PATENT DOCUMENTS

| 2011/0135018 A1* | 6/2011 | Zhang | H04L 25/03159 375/259 |
| 2011/0216722 A1* | 9/2011 | Yang | H04L 1/0073 370/329 |
| 2011/0242997 A1 | 10/2011 | Yin | |
| 2018/0192416 A1* | 7/2018 | Yin | H04L 1/1861 |

(Continued)

OTHER PUBLICATIONS

International Search Report and Written Opinion—PCT/US2018/030916—ISA/EPO—dated Aug. 13, 2018.
(Continued)

*Primary Examiner* — Vinncelas Louis
(74) *Attorney, Agent, or Firm* — Arent Fox, LLP

(57) ABSTRACT

Aspects herein describe determining a channel format for transmitting uplink communications in a slot, wherein the channel format is selected from multiple channel formats based at least in part on a payload size of the uplink communications, determining a starting symbol and an ending symbol of an uplink channel duration of the slot for transmitting the uplink communications, determining, based at least in part on the starting symbol and the ending symbol, a portion of the channel format to utilize in transmitting the uplink communications in the slot, and transmitting the uplink communications in the slot, wherein transmitting the uplink communications is based on the portion of the channel format.

51 Claims, 10 Drawing Sheets

(51) Int. Cl.
  *H04L 5/00* (2006.01)
  *H04J 13/16* (2011.01)
  *H04L 5/14* (2006.01)
  *H04B 1/713* (2011.01)

(52) U.S. Cl.
  CPC .......... *H04L 5/0012* (2013.01); *H04L 5/0016* (2013.01); *H04L 5/0044* (2013.01); *H04L 5/0048* (2013.01); *H04L 5/0092* (2013.01); *H04L 5/1469* (2013.01); *H04W 72/1268* (2013.01); *H04J 2013/165* (2013.01); *H04L 5/001* (2013.01); *H04L 5/0023* (2013.01)

(58) Field of Classification Search
  CPC ... H04L 5/1469; H04L 5/0092; H04L 5/0048; H04L 5/0012; H04L 5/0044; H04L 5/0023; H04L 5/001; H04J 13/16; H04J 2013/165
  See application file for complete search history.

(56) References Cited

U.S. PATENT DOCUMENTS

| | | | |
|---|---|---|---|
| 2018/0220414 A1* | 8/2018 | Yin | H04L 5/0053 |
| 2019/0349923 A1* | 11/2019 | Shao | H04W 72/0413 |
| 2020/0059332 A1* | 2/2020 | Takeda | H04L 5/0012 |

OTHER PUBLICATIONS

Mediatek Inc: "Discussion on Slot Structure and Channel Format", 3GPP Draft; R1-1609555_Discussion on Slot Structure and Channel Format, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016 (Oct. 9, 2016), pp. 1-6, XP051149592, Retrieved from the Internet: URL: http://www.3gpp.org/ftp/Meetings_3GPP_SYNC/RAN1/Docs/ [retrieved on Oct. 9, 2016].

* cited by examiner

CHANNEL FORMATS WITH FLEXIBLE DURATION IN WIRELESS COMMUNICATIONS

CLAIM OF PRIORITY UNDER 35 U.S.C. § 119

The present application for patent claims priority to Provisional Application No. 62/502,421, entitled "CHANNEL FORMATS WITH FLEXIBLE DURATION IN WIRELESS COMMUNICATIONS" filed May 5, 2017, which is assigned to the assignee hereof and hereby expressly incorporated by reference herein for all purposes.

BACKGROUND

Aspects of the present disclosure relate generally to wireless communication systems, and more particularly, to providing channel formats with flexible durations.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include services such as: enhanced mobile broadband (eMBB) addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

Generally, in 5G, long term evolution (LTE), and/or other wireless communications, a user equipment (UE) can communicate with a Node B over assigned channel resources, which may include portions of frequency over periods of time, such as a number of orthogonal frequency division multiplexing (OFDM) symbols, single carrier frequency division multiplexing (SC-FDM) symbols, and/or the like. In LTE, for example, the UE can be assigned channel resources in a subframe, which may be substantially 1 millisecond in duration, and may include two half-slots each with six or seven symbols. The two half-slots may be assigned to use different frequency resources for communications where inter-slot frequency hopping is configured. Additionally, LTE can use code division multiplexing (CDM) for achieving further diversity in communications, which may include using cyclic shifts, Walsh cover codes, pre-discrete Fourier transform (DFT) Walsh cover codes, etc. to generate communications for transmitting over the channel resources.

In 5G NR, time division duplexing (TDD) frame structures are proposed having multiple slots, where each slot can typically include a number of symbols including a physical downlink control channel (PDCCH) portion of the symbols and an uplink short burst (ULSB) portion of the symbols, where the UE can transmit some control data in the ULSB portion. Slots can be aggregated to reduce PDCCH/ULSB occurrence. Additionally, in 5G NR, an uplink long burst may be configured, which may use between 4 and 14 consecutive symbols in a slot.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communication is provided. The method includes determining a channel format for transmitting uplink communications in a slot, where the channel format is selected, based at least in part on a payload size of the uplink communications, from multiple channel formats, determining a starting symbol and an ending symbol of an uplink channel duration of the slot for transmitting the uplink communications, determining, based at least in part on the starting symbol and the ending symbol, a portion of the channel format to utilize in transmitting the uplink communications in the slot, and transmitting the uplink communications in the slot, where transmitting the uplink communications is based on the portion of the channel format.

In another example, an apparatus for wireless communication is provided. The apparatus includes a transceiver for communicating one or more wireless signals via at least a transmitter and one or more antennas, a memory configured to store instructions, and one or more processors communicatively coupled with the transceiver and the memory. The one or more processors are configured to determine a channel format for transmitting uplink communications in a slot, where the channel format is selected, based at least in part on a payload size of the uplink communications, from multiple channel formats, determine a starting symbol and an ending symbol of an uplink channel duration of the slot for transmitting the uplink communications, determine, based at least in part on the starting symbol and the ending symbol, a portion of the channel format to utilize in transmitting the uplink communications in the slot, and transmit the uplink communications in the slot, where transmitting the uplink communications is based on the portion of the channel format.

In another example, an apparatus for wireless communication is provided that includes means for determining a channel format for transmitting uplink communications in a slot, where the channel format is selected, based at least in part on a payload size of the uplink communications, from multiple channel formats, means for determining a starting symbol and an ending symbol of an uplink channel duration of the slot for transmitting the uplink communications, means for determining, based at least in part on the starting symbol and the ending symbol, a portion of the channel format to utilize in transmitting the uplink communications in the slot, and means for transmitting the uplink communications in the slot, where transmitting the uplink communications is based on the portion of the channel format.

In another example, a computer-readable medium including code executable by one or more processors for wireless communication is provided. The code includes code for determining a channel format for transmitting uplink communications in a slot, where the channel format is selected, based at least in part on a payload size of the uplink communications, from multiple channel formats, code for determining a starting symbol and an ending symbol of an uplink channel duration of the slot for transmitting the uplink communications, code for determining, based at least in part on the starting symbol and the ending symbol, a portion of the channel format to utilize in transmitting the uplink communications in the slot, and code for transmitting the uplink communications in the slot, where transmitting the uplink communications is based on the portion of the channel format.

In yet another example, a method for wireless communication is provided. The method includes indicating a starting symbol and an ending symbol of an uplink channel duration, determining a channel format for receiving communications over an uplink channel during the uplink channel duration in a slot, where the channel format is one of multiple channel formats and is based on at least a payload size, and receiving uplink communications according to the channel format and over the uplink channel during the uplink channel duration.

In another example, an apparatus for wireless communication is provided that includes a transceiver for communicating one or more wireless signals via at least a transmitter and one or more antennas, a memory configured to store instructions, and one or more processors communicatively coupled with the transceiver and the memory. The one or more processors are configured to indicate a starting symbol and an ending symbol of an uplink channel duration, determine a channel format for receiving communications over an uplink channel during the uplink channel duration in a slot, where the channel format is one of multiple channel formats and is based on at least a payload size, and receive uplink communications according to the channel format and over the uplink channel during the uplink channel duration.

In another example, an apparatus for wireless communication is provided that includes means for indicating a starting symbol and an ending symbol of an uplink channel duration, means for determining a channel format for receiving communications over an uplink channel during the uplink channel duration in a slot, where the channel format is one of multiple channel formats and is based on at least a payload size, and means for receiving uplink communications according to the channel format and over the uplink channel during the uplink channel duration.

In another example, a computer-readable medium including code executable by one or more processors for wireless communication is provided. The code includes code for indicating a starting symbol and an ending symbol of an uplink channel duration, code for determining a channel format for receiving communications over an uplink channel during the uplink channel duration in a slot, where the channel format is one of multiple channel formats and is based on at least a payload size, and code for receiving uplink communications according to the channel format and over the uplink channel during the uplink channel duration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
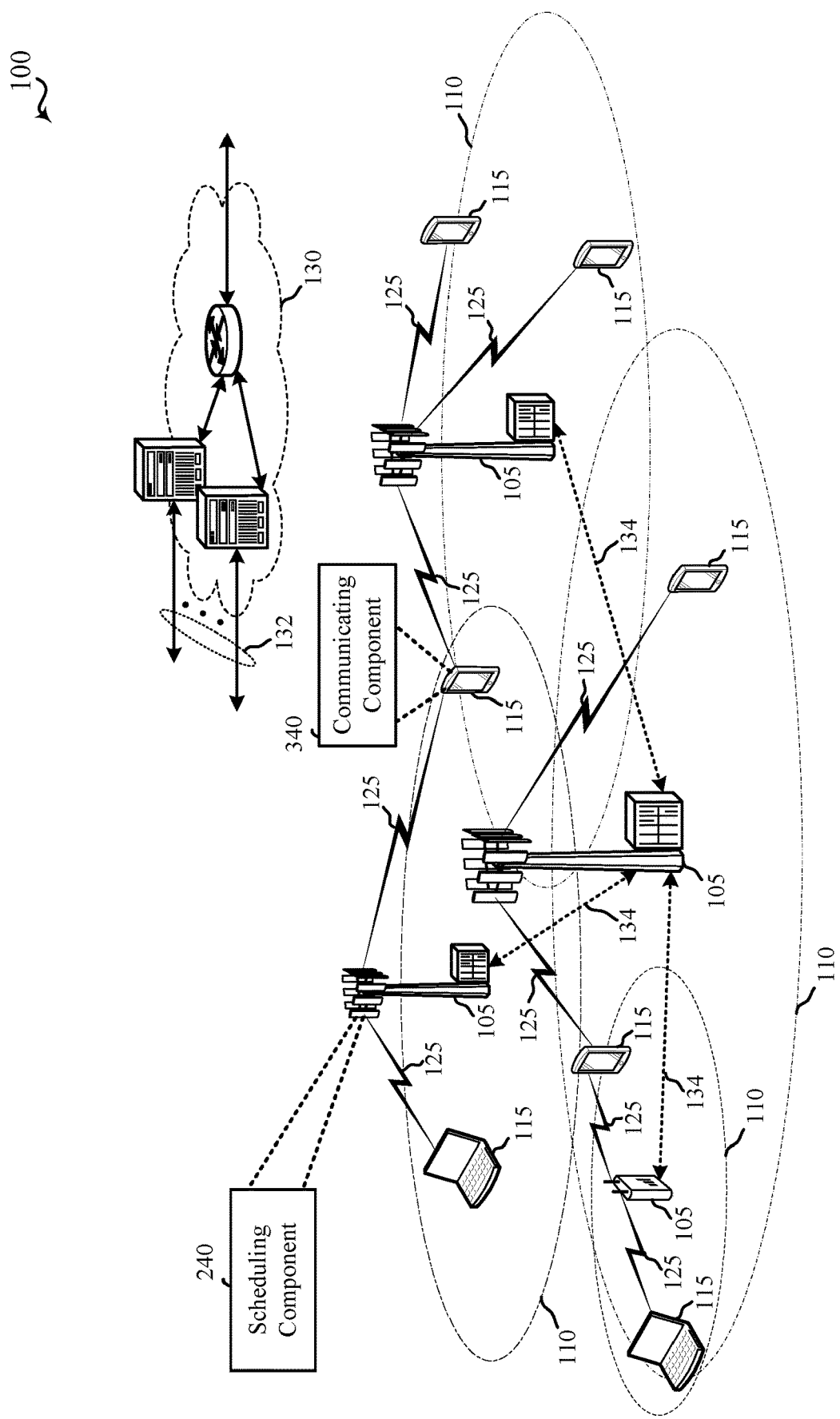
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to providing a flexible channel design for use with varying channel durations in wireless communications. For example, in wireless communication technologies, such as long term evolution (LTE), fifth generation (5G) new radio (NR), etc., wireless communications can be scheduled or can otherwise occur over portions of a frequency spectrum over time. The portions of frequency spectrum over time can be defined using orthogonal frequency division multiplexing (OFDM) symbols, single-carrier frequency division multiplexing (SC-FDM) symbols, and/or the like, and can be grouped into collections of symbols that define a slot. For example, a slot may include 14 symbols (e.g., where the symbols are associated with a normal cyclic prefix (CP)), 12 symbols (e.g., where the symbols are associated with an extended CP), and/or the like, depending on the configuration of the wireless communication technology. Moreover, for example, the slot may be around one millisecond (ms) in duration, and each symbol can have a substantially equal duration within the slot (e.g., 1/14 or 1/12 ms, depending on the configuration). In addition, for example, the wireless communication technology may define a transmission time interval (TTI) that includes one or more symbols within the slot (e.g., one symbol TTI, two symbol TTI, etc.), the entire slot (e.g., one slot TTI), and/or the like.

In these examples, multiple slot structures can be defined having different configurations of uplink and downlink symbols within a given slot; thus, the number and/or placement of uplink symbols within a given slot may vary based on the configuration. Accordingly, examples described herein relate to providing channel designs having flexible durations and/or corresponding to certain channel formats. In an example, multiple available channel formats can be defined for different payload sizes of data to be transmitted over corresponding channel(s), and a device can determine at least a portion of one of the channel formats to use in performing wireless communications. For example, the channel format can be selected based on payload size, and the portion of one of the channel formats can be determined based on an assigned channel duration. In an example, the channel formats may be defined with a fixed demodulation reference signal (DM-RS) pattern for transmitting DM-RS according to the given channel format, and/or such that a selected portion of one of the channel formats can include at least one DM-RS. In addition, for example, the channel formats may be defined to include at least one supported frequency hopping position (e.g., where intra-slot hopping is enabled) for frequency hopping across slots or other time divisions defined by the wireless communication technology. In one example, the DM-RS pattern may be different per half slot for a channel format based on whether intra-slot hopping is enabled. In one example, the DM-RS pattern may be the same per half slot for a format regardless of whether intra-slot hopping is enabled. In addition, for example, the device may determine the channel format based at least in part on a determined Doppler mode. Moreover, for example, a user multiplexing scheme, spreading factor, and/or orthogonal cover set to use (e.g., in code division multiplexing (CDM)) may be determined based on the channel format. In any case, in these examples, a flexible channel design can be provided for wireless communications having dynamic channel durations.

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by the UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by the UEs 115 with service subscriptions with the network provider. A femto cell may also cover a small geographic area (e.g., a home) and may provide restricted access by the UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between the base stations 105 and UEs 115. Additionally or alternatively, the base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In an example, a base station 105 may include a scheduling component 240 for scheduling resources to one or more UEs 115 to facilitate wireless communications with the UE 115, and the UE 115 may include a communicating component 340 for receiving the resource scheduling and accordingly communicating with the base station 105 over the resources. The scheduling component 240, for example, may be configured to allocate an uplink channel duration to the UE 115 for transmitting uplink communications in one or more slots, where a slot may include a consecutive number of symbols (e.g., 14 symbols), which may include orthogonal frequency division (OFDM) symbols, single-carrier frequency division multiplexing (SC-FDM) symbols, or the like. In addition, scheduling component 240 and/or communicating component 340 can select, based at least in part on a payload size of the uplink communications, one of multiple possible uplink channel formats for transmitting uplink communications during the channel duration. In any case, communicating component 340 can select a portion of the channel format to use in transmitting the uplink communications during the allocated channel duration, and may accordingly transmit the uplink communications to the base station 105 based at least in part on the selected portion of the channel format.

Figure 2:
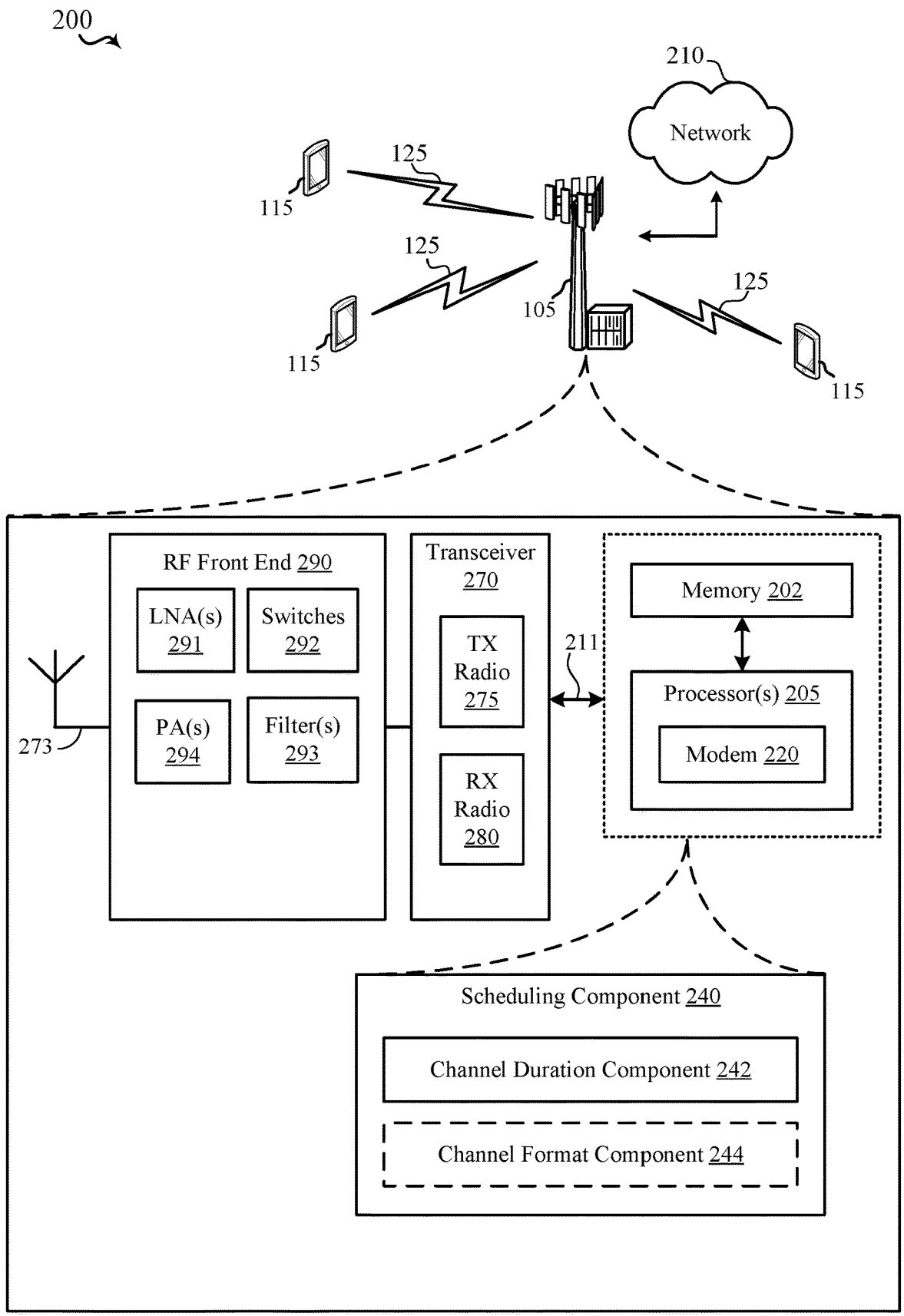
FIG. 2 is a block diagram illustrating an example of a base station, in accordance with various aspects of the present disclosure.
Figure 3:
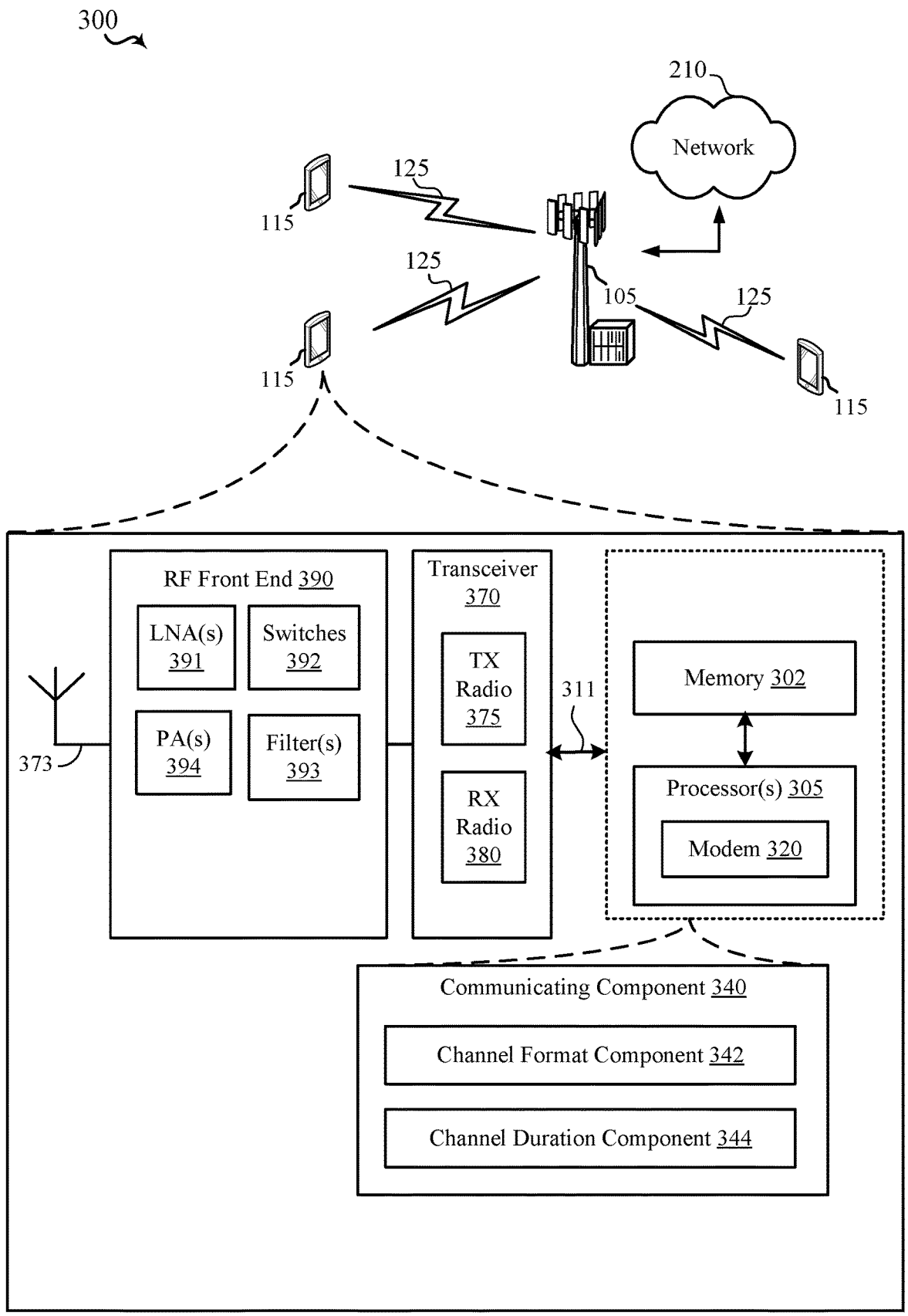
FIG. 3 is a block diagram illustrating an example of a UE, in accordance with various aspects of the present disclosure.
Figure 4:
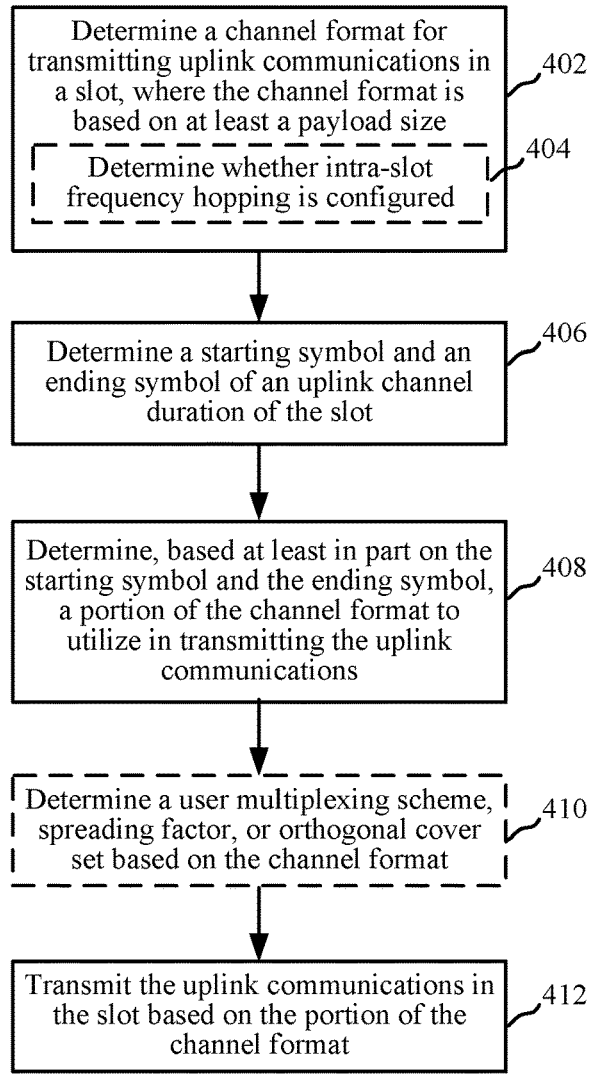
FIG. 4 is a flow chart illustrating an example of a method for transmitting uplink communications, in accordance with various aspects of the present disclosure.
Figure 5:
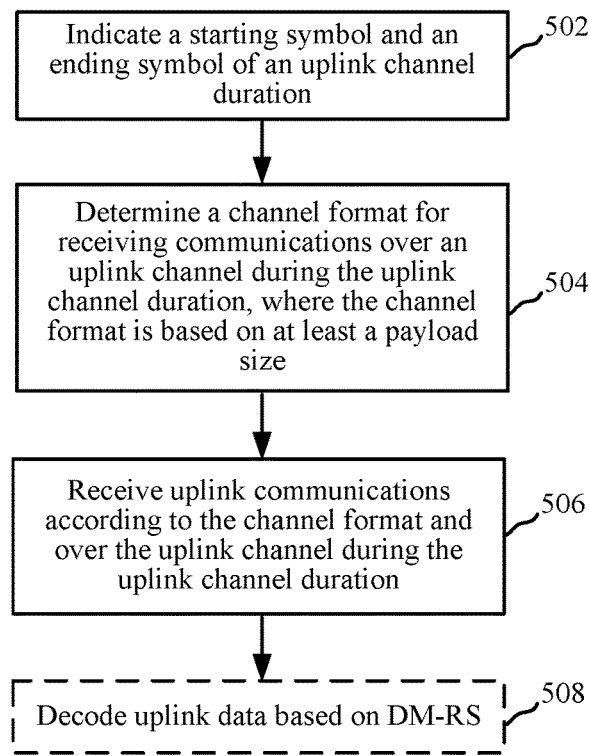
FIG. 5 is a flow chart illustrating an example of a method for configuring uplink communications, in accordance with various aspects of the present disclosure.

Turning now to FIGS. 2-9, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, a block diagram 200 is shown that includes a portion of a wireless communications system having multiple UEs 115 in communication with a base station 105 via communication links 125, where the base station 105 is also communicatively coupled with a network 210. The UEs 115 may be examples of the UEs described in the present disclosure that are configured to transmit uplink communications according to a portion of a channel format selected based at least in part on an allocated uplink channel duration. Moreover the base station 105 may be an example of the base stations described in the present disclosure (e.g., eNB, gNB, etc.) that are configured to allocate an uplink channel duration for UEs to utilize in transmitting uplink communications based on a channel format.

In an aspect, the base station in FIG. 2 may include one or more processors 205 and/or memory 202 that may operate in combination with a scheduling component 240 to perform the functions, methodologies (e.g., method 500 of FIG. 5), or other methods presented in the present disclosure, which may include scheduling communication resources for one or more UEs 115. In accordance with the present disclosure, the scheduling component 240 may include a channel duration component 242 for allocating an uplink channel duration to one or more UEs 115, and an optional channel format component 244 for indicating one or more parameters related to an uplink channel format to the UE 115 and/or for receiving an indication of a selected uplink channel format from the UE 115 based on a payload size of uplink communications.

The one or more processors 205 may include a modem 220 that uses one or more modem processors. The various functions related to the scheduling component 240, and/or sub-components thereof, may be included in modem 220 and/or processor 205 and, in an aspect, can be executed by a single processor, while in other aspects, different ones of the functions may be executed by a combination of two or more different processors. For example, in an aspect, the one or more processors 205 may include any one or any combination of a modem processor, or a baseband processor, or a digital signal processor, or a transmit processor, or a transceiver processor associated with transceiver 270, or a system-on-chip (SoC). In particular, the one or more processors 205 may execute functions and components included in the scheduling component 240.

In some examples, the scheduling component 240 and each of the sub-components may comprise hardware, firmware, and/or software and may be configured to execute code or perform instructions stored in a memory (e.g., a computer-readable storage medium, such as memory 202 discussed below). Moreover, in an aspect, the base station 105 in FIG. 2 may include a radio frequency (RF) front end 290 and transceiver 270 for receiving and transmitting radio transmissions to, for example, UEs 115. The transceiver 270 may coordinate with the modem 220 to receive signals for, or transmit signals generated by, the scheduling component 240 to the UEs 115. The RF front end 290 may be communicatively coupled with one or more antennas 273 and can include one or more switches 292, one or more amplifiers (e.g., power amplifiers (PAs) 294 and/or low-noise amplifiers 291), and one or more filters 293 for transmitting and receiving RF signals on uplink channels and downlink channels. In an aspect, the components of the RF front end 290 can be communicatively coupled with transceiver 270. The transceiver 270 may be communicatively coupled with the one or more of modem 220 and processors 205.

The transceiver 270 may be configured to transmit (e.g., via transmitter (TX) radio 275) and receive (e.g., via receiver (RX) radio 280) wireless signals through antennas 273 via the RF front end 290. In an aspect, the transceiver 270 may be tuned to operate at specified frequencies such that the base station 105 can communicate with, for example, UEs 115. In an aspect, for example, the modem 220 can configure the transceiver 270 to operate at a specified frequency and power level based on the configuration of the base station 105 and communication protocol used by the modem 220.

The base station 105 in FIG. 2 may further include a memory 202, such as for storing data used herein and/or local versions of applications or scheduling component 240 and/or one or more of its sub-components being executed by processor 205. Memory 202 can include any type of computer-readable medium usable by a computer or processor 205, such as random access memory (RAM), read only memory (ROM), tapes, magnetic discs, optical discs, volatile memory, non-volatile memory, and any combination thereof. In an aspect, for example, memory 202 may be a computer-readable storage medium that stores one or more computer-executable codes defining scheduling component 240 and/or one or more of its sub-components. Additionally or alternatively, the base station 105 may include a bus 211 for communicatively coupling one or more of the RF front end 290, the transceiver 274, the memory 202, or the processor 205, and to exchange signaling information between each of the components and/or sub-components of the base station 105.

In an aspect, the processor(s) 205 may correspond to one or more of the processors described in connection with the base station in FIG. 9. Similarly, the memory 202 may correspond to the memory described in connection with the base station in FIG. 9.

Referring to FIG. 3, a block diagram 300 is shown that includes a portion of a wireless communications system having multiple UEs 115 in communication with a base station 105 via communication links 125, where the base station 105 is also communicatively coupled with a network 210. The UEs 115 may be examples of the UEs described in the present disclosure that are configured to transmit uplink communications according to a portion of a channel format selected based at least in part on an allocated uplink channel duration. Moreover the base station 105 may be an example of the base stations described in the present disclosure (e.g., eNB, gNB, etc.) that are configured to allocate an uplink channel duration for UEs to utilize in transmitting uplink communications based on a channel format.

In an aspect, the UE 115 in FIG. 3 may include one or more processors 305 and/or memory 302 that may operate in combination with a communicating component 340 to perform the functions, methodologies (e.g., method 400 of FIG. 4), or other methods presented in the present disclosure. In accordance with the present disclosure, the communicating component 340 may include a channel format component 342 for determining a channel format for transmitting uplink communications, where the channel format may be selected based on a payload size of uplink communications at the UE 115, and/or a channel duration component 344 for determining an uplink channel duration allocated by a base station 105 for transmitting uplink communications.

The one or more processors 305 may include a modem 320 that uses one or more modem processors. The various functions related to the communicating component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, or a baseband processor, or a digital signal processor, or a transmit processor, or a transceiver processor associated with transceiver 370, or a system-on-chip (SoC). In particular, the one or more processors 305 may execute functions and components included in the communicating component 340.

In some examples, the communicating component 340 and each of the sub-components may comprise hardware, firmware, and/or software and may be configured to execute code or perform instructions stored in a memory (e.g., a computer-readable storage medium, such as memory 302 discussed below). Moreover, in an aspect, the UE 115 in FIG. 3 may include an RF front end 390 and transceiver 370 for receiving and transmitting radio transmissions to, for example, base stations 105. The transceiver 370 may coordinate with the modem 320 to receive signals that include the packets as received by the communicating component 340. The RF front end 390 may be communicatively coupled with one or more antennas 373 and can include one or more switches 392, one or more amplifiers (e.g., PAs 394 and/or LNAs 391), and one or more filters 393 for transmitting and receiving RF signals on uplink channels and downlink channels. In an aspect, the components of the RF front end 390 can be communicatively coupled with transceiver 370. The transceiver 370 may be communicatively coupled with one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the UE 115 can communicate with, for example, base stations 105. In an aspect, for example, the modem 320 can configure the transceiver 370 to operate at a specified frequency and power level based on the configuration of the UE 115 and communication protocol used by the modem 320.

The UE 115 in FIG. 3 may further include a memory 302, such as for storing data used herein and/or local versions of applications or communicating component 340 and/or one or more of its sub-components being executed by processor 305. Memory 302 can include any type of computer-readable medium usable by a computer or processor 305, such as RAM, ROM, tapes, magnetic discs, optical discs, volatile memory, non-volatile memory, and any combination thereof. In an aspect, for example, memory 302 may be a computer-readable storage medium that stores one or more computer-executable codes defining communicating component 340 and/or one or more of its sub-components. Additionally or alternatively, the UE 115 may include a bus 311 for communicatively coupling one or more of the RF front end 390, the transceiver 374, the memory 302, or the processor 305, and to exchange signaling information between each of the components and/or sub-components of the UE 115.

In an aspect, the processor(s) 305 may correspond to one or more of the processors described in connection with the UE in FIG. 9. Similarly, the memory 302 may correspond to the memory described in connection with the UE in FIG. 9.

FIG. 4 illustrates a flow chart of an example of a method 400 for transmitting (e.g., by a UE) uplink communications in an uplink channel duration based on a selected uplink channel format. In method 400, blocks indicated as dashed boxes may represent optional steps.

In method 400, at Block 402, a channel format for transmitting uplink communications in a slot can be determined, where the channel format is based on at least a payload size. In an aspect, the channel format component 342 can, e.g., in conjunction with processor(s) 305, memory 302, transceiver 370 and/or communicating component 340, determine the channel format for transmitting uplink communications in the slot, where the channel format is based on at least the payload size of the uplink communications. For example, channel format component 342 can determine an uplink channel format for transmitting the uplink communications where the uplink channel format can be one of multiple possible channel formats. In an example, the multiple channel formats can be defined for corresponding payload sizes and/or other channel conditions (e.g., a Doppler mode) and may each include a fixed pattern of DM-RS symbols, a hopping position (e.g., at a symbol boundary) for performing frequency hopping when configured, one or more fixed or flexible multiplexing schemes, and/or the like. Thus, for example, given a payload size of the uplink communications, a channel format can be selected to accommodate the uplink communications.

In one example, the channel formats and/or parameters for determining which channel format to use (based on payload size) can be configured at the UE 115 by the base station 105

(e.g., using RRC or other higher layer signaling, dedicated control information for the UE 115, broadcast signals from the base station 105, etc.). Thus, in one example, the UE 115 can receive the configuration related to the channel formats from the base station 105. In another example, parameters related to the channel formats can be otherwise configured in the memory 302 of the UE 115. Examples of channel formats 600, 602, 604 are illustrated in FIG. 6.

Figure 6:
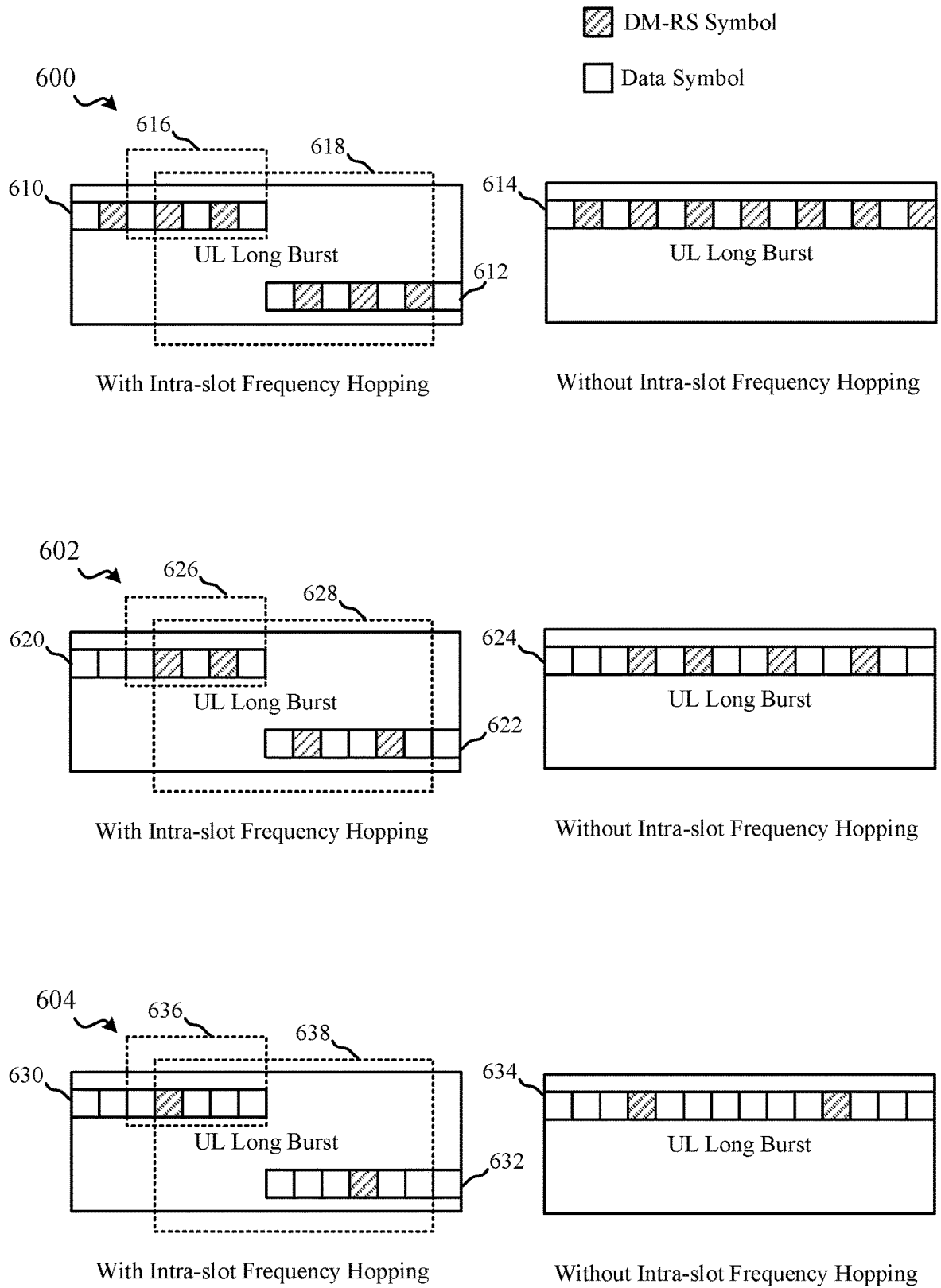
FIG. 6 illustrates examples of channel formats, in accordance with various aspects of the present disclosure.

For example, as shown in FIG. 6, channel format 600 can support a small payload size, such as less than (and/or equal to) x bits (e.g., x=2) and/or where the payload is for uplink control data. Channel format 600 can include a DM-RS pattern of alternating DM-RS symbols and data symbols multiplexed in the time domain, which may include at least enough symbols for transmitting the small payload within the slot. In one example, channel format 600 can designate the starting symbol as for DM-RS. For example, a different DM-RS pattern can exist based on whether intra-slot frequency hopping is configured. For example, where frequency hopping is configured, channel format 600 can include a half slot 610 associated with a first frequency and another half slot 612 associated with a second frequency. Each half slot 610, 612 can have a DM-RS pattern of alternating DM-RS symbols and data symbols, which can result in 3 DM-RS symbols per half slot. In another example, where intra-slot frequency hopping is not configured, channel format 600 can be specified over the slot 614 with the DM-RS pattern having alternating DM-RS symbols and data symbols, which can result in 7 DM-RS symbols per slot. In another example, where intra-slot frequency hopping is not configured, channel format 600 can be specified over the slot 614 with the same DM-RS pattern per half slot as the slot 610 with intra-slot hopping, which can result in 6 DM-RS symbols per slot. In another example, the DM-RS pattern may be fixed relatively in the PUCCH duration. For example, a DM-RS pattern of alternating DM-RS symbols and data symbols may be used with the first symbol in the PUCCH duration is always DM-RS. In this case, the DM-RS symbol indices are not fixed in the slot. For example, if a PUCCH duration spanning from symbol 2 to symbol 10, the DM-RS symbols can be symbol 2, 4, 6, 8, and 10. In another example, if a PUCCH duration spanning from symbol 3 to symbol 10, the DM-RS symbols can be symbol 3, 5, 7, 9. Alternatively, a DM-RS pattern of alternating DM-RS symbols and data symbols may be used with the first symbol in the PUCCH duration is always data symbols. In an example, the channel format may be based on whether frequency hopping is enabled (e.g., and each slot may begin with a DM-RS symbol, as depicted in channel format 600). In another example, the channel format may not be based on whether frequency hopping is enabled (e.g., the DM-RS symbols for the same PUCCH duration can be the same regardless of whether frequency hopping is enabled). Additionally, for example, channel format 600 can be associated with per symbol multiplexing using a Chu sequence, computer generated sequence (CGS), etc. with different cyclic shifts. In any case, for example, channel format component 342 may determine to use the channel format 600, or a similar channel format, based on determining that the payload size of the uplink communications is of the small size (e.g., is less than (and/or equal to) 2 bits).

Moreover, in an example, channel format 600 can be associated with flexible multi-symbol multiplexing with different orthogonal covers such that one or more parameters related to performing CDM of uplink communications may be implicitly derived based on an uplink channel duration, as described further herein. In an example, the one or more parameters may include spreading factors, orthogonal cover sets, and/or the like. For example, where intra-slot hopping is configured and for a channel duration of 14 symbols, the UE 115 can use DFT3 for multiplexing DM-RS symbols and Hadamard 4 code for multiplexing data symbols. In another example, where intra-slot hopping is configured, and for a channel duration of 1-5 symbols, Hadamard 2 can be used for multiplexing DM-RS symbols and DFT3 can be used for multiplexing data symbols. In another example, where intra-slot hopping is configured and for a channel duration of 6-10 symbols, there may be no spreading configured. In an example, the base station 105 can schedule UEs 115 to ensure that UEs being scheduled with different uplink channel durations do not overlap (as this may result in UEs using different CDM parameters transmitting in the same symbol), unless only FDM is used in scheduling the UEs 115. In another example, multi-symbol multiplexing may be enabled for some channel durations (e.g., when spanning the first or second half slots or both half slots) and disabled for others. In another example, multi-symbol multiplexing may have a fixed CDM group boundary, e.g., DM-RS spreading starts at symbol index being multiple of 4, or data symbols spreading starts at symbol index being multiple of 4 plus one.

In another example, channel format 602 can support a medium payload size, such as between x and y bits (e.g., y=22). Channel format 602 can include a DM-RS pattern having 3 or 4 symbols. For example, a different DM-RS pattern can exist based on whether intra-slot frequency hopping is configured. For example, where frequency hopping is configured, channel format 602 can include a half slot 620 associated with a first frequency and another half slot 622 associated with a second frequency. Each half slot 620, 622 can have a fixed DM-RS pattern of 2 DM-RS symbols (e.g., symbols 4, 6 in half slot 620, and symbols 9, 12 (or 11), in half slot 622) and the remaining symbols as data symbols. In another example, where intra-slot frequency hopping is not configured, channel format 602 can be specified over the slot 624 with the fixed DM-RS pattern having 3 or 4 DM-RS symbols (e.g., symbols 4, 7 (or 8), 12 (or 11) for 3 DM-RS symbols, symbols 4, 6, 9, 12 (or 11) for 4 DM-RS symbols, etc.) and the remaining symbols as data symbols. Though specific symbols are shown as used for DM-RS, other symbols could be used as well to achieve a desired channel estimation performance. Additionally, for example, channel format 602 can be associated with per symbol multiplexing using a Chu sequence, computer generated sequence (CGS), etc. with different cyclic shifts, a pre-DFT spreading, and/or the like. The spreading factor may be configurable. In an example, a spreading factor of one may be used to (or may be the same as) disable per symbol multiplexing.

In another example, channel format 604 can support a large payload size, such as more than y bits. Channel format 604 can include a DM-RS pattern having 1 or 2 symbols. For example, a different DM-RS pattern can exist based on whether intra-slot frequency hopping is configured. For example, where frequency hopping is configured, channel format 604 can include a half slot 630 associated with a first frequency and another half slot 632 associated with a second frequency. Each half slot 630, 632 can have a fixed DM-RS pattern of 1 DM-RS symbol (e.g., symbol 4 or 5 in half slot 630, and symbol 11 or 12 in half slot 632) and the remaining symbols as data symbols. In another example, where intra-slot frequency hopping is not configured, channel format 602 can be specified over the slot 634 with the fixed DM-RS pattern having 1 or 2 DM-RS symbols (e.g., symbol 7 or 8 for 1 DM-RS symbol, symbols 4 (or 5), 11 (or 12) for 2 DM-RS symbols, etc.) and the remaining symbols as data symbols. Additionally, for example, channel format 604 can be associated with per symbol multiplexing using a pre-DFT spreading, and/or the like. The spreading factor may be configurable. In an example, a spreading factor of one may be used to (or may be the same as) disable per symbol multiplexing.

Accordingly, in the examples provided above, channel format component 342 can determine to use one of channel format 600, 602, 604, where the channel format is selected based on payload size of uplink communications to be transmitted to the base station 105. In one example, channel format component 342 can select channel format 600 where the payload size is less than x bits, channel format 602 where the payload size is between x and y bits, or channel format 604 where the payload size is greater than y bits. In another example, the base station 105 may select the channel format based on an indicated payload size (e.g., or a buffer status report or other indication of uplink data to be transmitted) received from the UE 115, and the base station 105 can transmit an indication of the selected channel format to the UE 115 (e.g., in dedicated downlink control signaling, higher layer signaling such as RRC layer signaling, etc.).

In an example, determining the channel format at Block 402 may optionally include, at Block 404, determining whether intra-slot frequency hopping is configured. In an aspect, the channel format component 342 can, e.g., in conjunction with processor(s) 305, memory 302, transceiver 370 and/or communicating component 340, determine whether intra-slot frequency hopping is configured. For example, the base station 105 can configure intra-slot frequency hopping for the UE 115 (e.g., by transmitting dedicated downlink control signaling, higher layer signaling such as radio resource control (RRC) layer signaling, etc. indicating to enable the frequency hopping). In this example, channel format component 342 can receive the indication from the base station 105. In any case, for example, channel format component 342 can accordingly determine a channel format to use, which may include determining whether to use channel format 600, 602, or 604 with or without consideration for intra-slot frequency hopping, based on the determination.

At Block 406, a starting symbol and an ending symbol of an uplink channel duration of the slot can be determined. In an aspect, the channel duration component 344 can, e.g., in conjunction with processor(s) 305, memory 302, transceiver 370 and/or communicating component 340, determine the starting symbol and the ending symbol of the uplink channel duration of the slot. For example, the base station 105 can allocate the uplink channel duration to the UE 115 in a resource grant, where the resource grant may indicate a slot for uplink communications, as well as a starting symbol in the slot and an ending symbol (or duration from which the ending symbol can be derived, and/or the like) for uplink communications. For example, the uplink channel duration may correspond to an uplink long burst, as described, having a duration of a number of symbols in the slot (e.g., in the range of 4 to 14 symbols). The base station 105 may configure the uplink channel duration based on various factors, such as signal quality of communications with a UE 115, a number of UEs 115 supported by the base station 105, a buffer status report from the UE 115, etc.

Figure 7A:
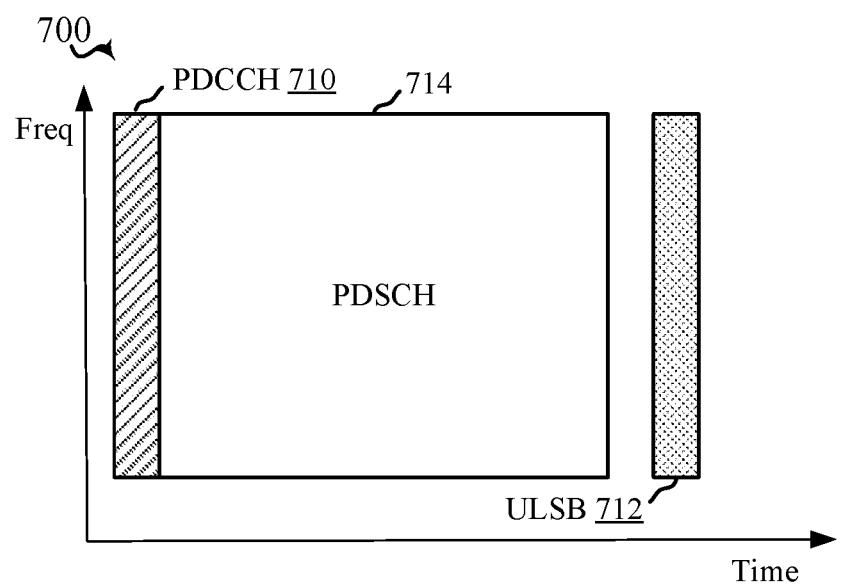
FIGS. 7A and 7B illustrate examples of slot configurations, in accordance with various aspects of the present disclosure.
Figure 7A:
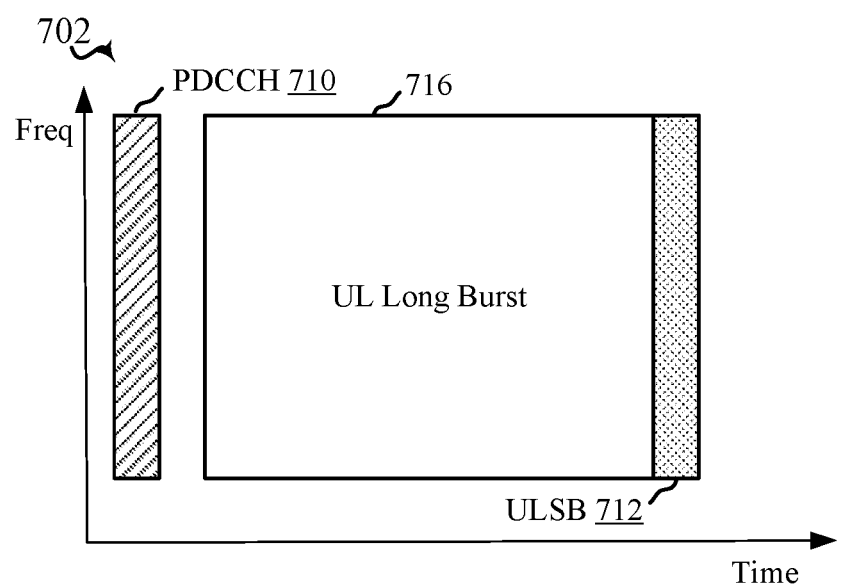
Figure 7B:
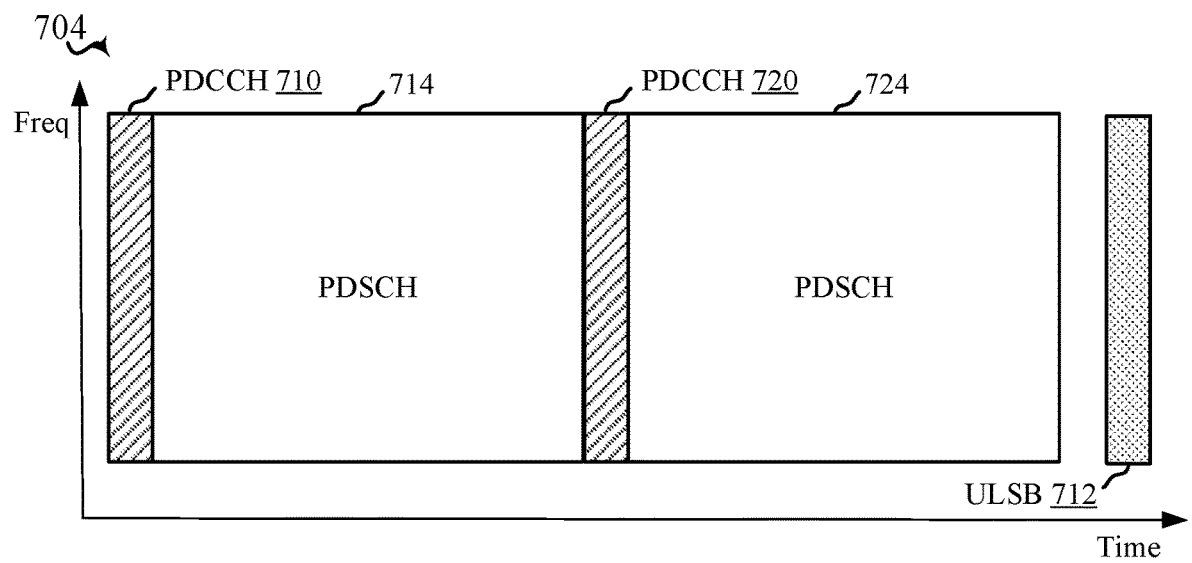
Figure 7B:
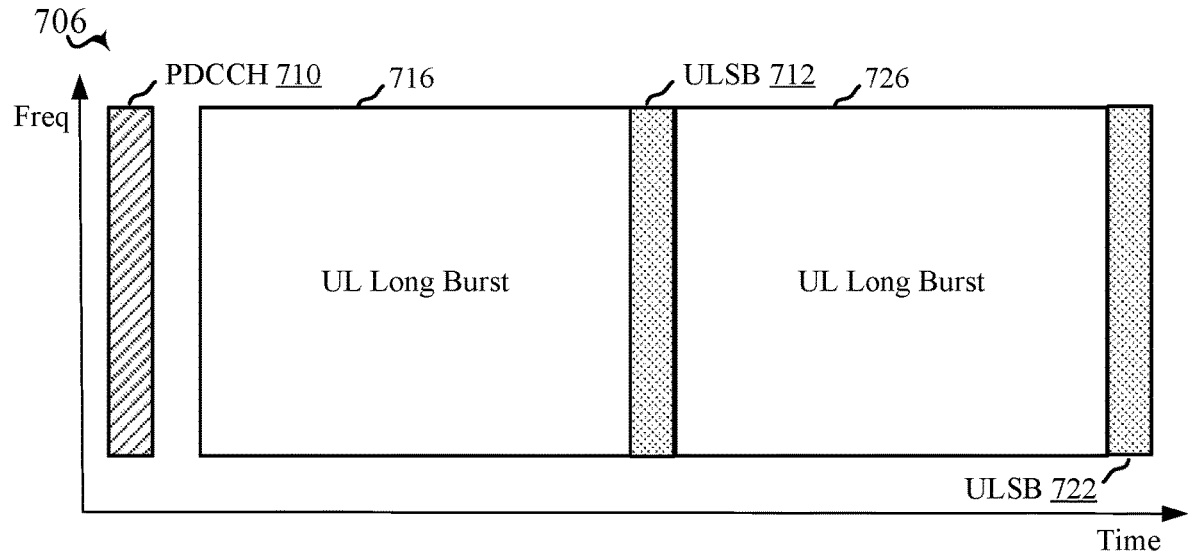

In one example, in 5G, various slot configurations are possible, as described above. FIGS. 7A and 7B depict examples of slot configurations 700, 702, 704, 706 that can be used in 5G or other wireless communication technologies. For example, slot configuration 700 can include a PDCCH symbol 710 and an uplink short burst (ULSB) symbol 712, with a PDSCH region of symbols 714 in between. In addition, a blank symbol or other period of time can be included between the PDSCH region of symbols 714 and the ULSB symbol 712 to allow time for switching between downlink and uplink communications in the slot configuration 700. In another example, slot configuration 702 includes the PDCCH symbol 710 and the ULSB 714 with a UL long burst region of symbols 716 in between. In this example, the blank symbol or other period of time can be included between PDCCH 710 and the UL long burst region of symbols 716. In either example, the PDSCH region of symbols 714 or the UL long burst region of symbols may include a number of symbols, such as up to 11 symbols in a slot of 14 symbols.

In addition, in an example, slot configurations 704, 706 can be used to reduce overhead associated with ULSB symbols and/or PDCCH symbols (and/or associated switching to/from uplink communications), respectively, by combining symbols in multiple slots. In these examples, slot configuration 704 can include PDCCH 710 and the PDSCH region of symbols 714 followed by another PDCCH 720 and another PDSCH region of symbols 724 before a single ULSB symbol 712. Similarly, in slot configuration 706, the single PDCCH symbol 710 is included, followed by the UL long burst region of symbols 716, a ULSB 712, another UL long burst region of symbols 726, and another ULSB 722. Slot configuration 704 can allow for increasing a number of downlink symbols over two slots by aggregating slots to reduce ULSB occurrence. Slot configuration 706 can allow for increasing a number of uplink symbols over two slots by aggregating slots to reduce PDCCH occurrence. Thus, when using slot configuration 706, for example, a 14 symbol uplink long burst may be possible (e.g., in the second slot) when aggregated with one or more other uplink long burst slots where at least one of the slots includes PDCCH and/or ULSB. In any case, the duration of the uplink channel in the slot can be determined (e.g., based on a slot configuration received from the base station 105 or otherwise stored in a memory 302 of the UE 115) and used in determining a portion of the determined format to use in transmitting uplink communications in the slot.

At Block 408, a portion of the channel format to utilize in transmitting uplink communications can be determined based at least in part on the starting symbol and the ending symbol. In an aspect, the channel format component 342 can, e.g., in conjunction with processor(s) 305, memory 302, transceiver 370 and/or communicating component 340, determine, based at least in part on the starting symbol and the ending symbol, the portion of the channel format to utilize in transmitting the uplink communications. For example, given channel format 600, 602, or 604, the portion of the format can be determined as the symbols corresponding to the starting symbol and ending symbol specified by the base station 105 for the uplink channel duration.

Figure 8:
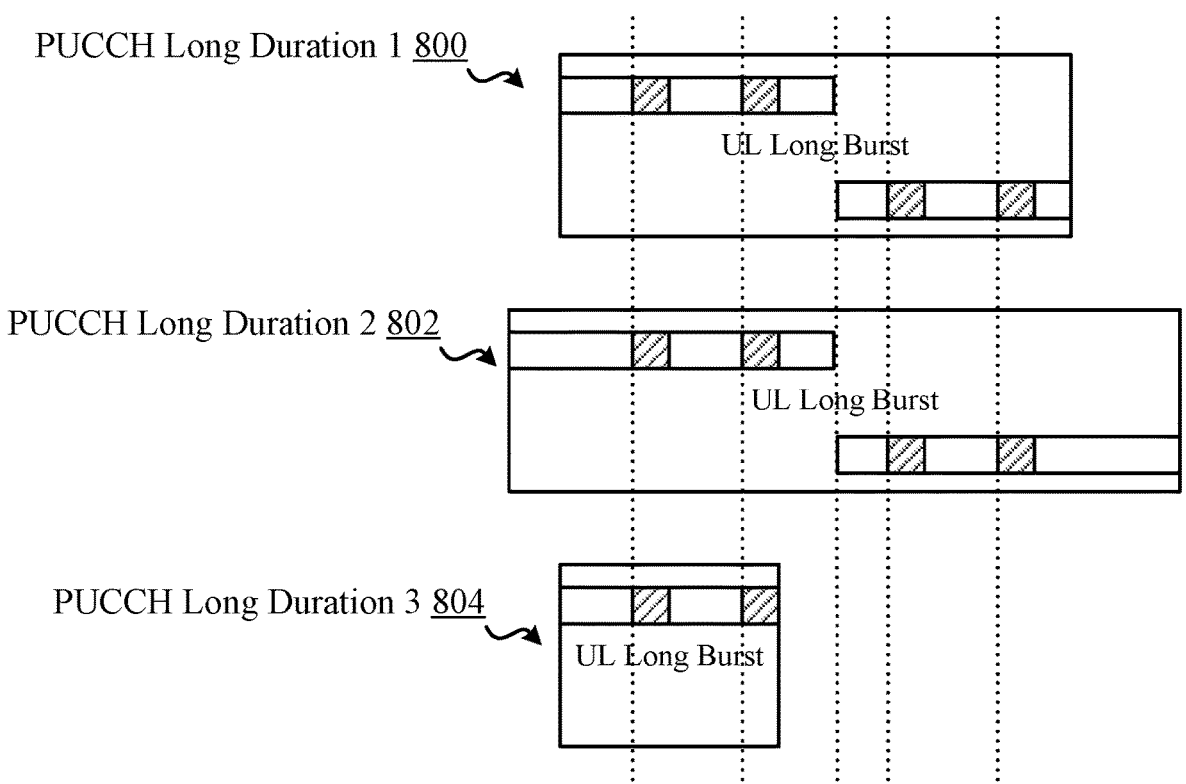
FIG. 8 illustrates an example of selected portions of a channel format, in accordance with various aspects of the present disclosure.

Examples are shown in FIG. 8, which illustrates uplink long burst allocations 800, 802, 804 and a corresponding channel format (e.g., similar to channel format 602) that includes a fixed DM-RS pattern and/or hopping position, with DM-RS designated in fixed symbols and other data (e.g., for PUCCH communications) designated in other symbols. For example, the channel format is structured such that each uplink long burst allocation 800, 802, 804 over the channel format can include at least one DM-RS symbol and a hopping position, where appropriate for the channel duration.

For example, referring to FIG. 6, where the uplink channel duration is determined to be from starting symbol 2 to ending symbol 6, channel format 600 is selected (e.g., based on the payload size of the uplink data), and intra-slot hopping is configured, channel format component 342 can determine portion 616 of channel format 600 to be used for transmitting uplink communications. Correspondingly, for example, channel format component 342 may also determine to use Hadamard 2 for DM-RS symbols and DFT3 for data symbols for multi-symbol multiplexing (or Chu/CGS for per symbol multiplexing). In another example, where the uplink channel duration is from starting symbol 3 to ending symbol 12, channel format 600 is selected, and intra-slot hopping is configured, channel format component 342 can determine portion 618 of channel format 600 to be used for transmitting uplink communications. In yet another example, where the uplink channel duration is from starting symbol 0 to ending symbol 13, channel format 600 is selected, and intra-slot hopping is not configured, channel format component 342 can determine the entire portion of slot 614 of channel format 600 to be used for transmitting uplink communications. Correspondingly, for example, channel format component 342 may also determine to use DFT3 for DM-RS symbols and Hadamard 4 code for data symbols for multi-symbol multiplexing (or Chu/CGS for per symbol multiplexing).

In another example, where the uplink channel duration is from starting symbol 2 to ending symbol 6, channel format 602 is selected (e.g., based on the payload size of the uplink data), and intra-slot hopping is configured, channel format component 342 can determine portion 626 of channel format 602 to be used for transmitting uplink communications. In another example, where the uplink channel duration is from starting symbol 3 to ending symbol 12, channel format 602 is selected, and intra-slot hopping is configured, channel format component 342 can determine portion 628 of channel format 602 to be used for transmitting uplink communications. In yet another example, where the uplink channel duration is from starting symbol 0 to ending symbol 13, channel format 602 is selected, and intra-slot hopping is not configured, channel format component 342 can determine the entire portion of slot 624 of channel format 602 to be used for transmitting uplink communications.

In another example, where the uplink channel duration is from starting symbol 2 to ending symbol 6, channel format 604 is selected (e.g., based on the payload size of the uplink data), and intra-slot hopping is configured, channel format component 342 can determine portion 636 of channel format 604 to be used for transmitting uplink communications. In another example, where the uplink channel duration is from starting symbol 3 to ending symbol 12, channel format 604 is selected, and intra-slot hopping is configured, channel format component 342 can determine portion 638 of channel format 604 to be used for transmitting uplink communications. In yet another example, where the uplink channel duration is from starting symbol 0 to ending symbol 13, channel format 604 is selected, and intra-slot hopping is not configured, channel format component 342 can determine the entire portion of slot 634 of channel format 604 to be used for transmitting uplink communications.

In one example, determining the channel format at Block 402 may instead occur after (or may also occur after in addition to before) determining the portion of the channel format at Block 408 (and/or after determining the starting symbol and ending symbol in Block 406). For example, determining the channel format at Block 402 may also be based determining the portion of the channel format to use based on the starting symbol and the ending symbol of the uplink channel duration. In an example, channel format component 342 can determine the channel format to ensure that the portion of the channel format corresponding to the uplink channel duration includes at least one DM-RS symbol. For example, where payload size is large (e.g., greater than y) and channel format 604 is determined, and where the uplink channel duration is specified to be symbols 4 to 9, there may not be a DM-RS symbol in the corresponding portion of channel format 604. Accordingly, in this example, channel format component 342 may determine to instead use (e.g., fallback to) another channel format with a higher DM-RS to data symbol ratio, such as channel format 602, based on the specified uplink channel duration.

Optionally, at Block 410, a user multiplexing scheme, spreading factor, or orthogonal cover set can be determined based on the channel format. In an aspect, the channel format component 342 can, e.g., in conjunction with processor(s) 305, memory 302, and/or transceiver 370, determine the user multiplexing scheme, spreading factor, or orthogonal cover set based on the channel format, as described above. In one example, channel format component 342 can further determine the user multiplexing scheme, spreading factor, or orthogonal cover set based on the portion of the channel format selected for transmitting the uplink communications. For example, channel format component 342 can determine whether to use per symbol or multi-symbol multiplexing based on the channel format and/or the determined portion of the channel format. For example, channel format component 342 can determine whether to use a Chu or CGS sequence with different cyclic shifts for a per symbol multiplexing, whether to use DFT3 and/or Hadamard codes for certain symbols for multi-symbol multiplexing (e.g., for channel format 600) and/or the like. In examples, as described above, channel format component 342 may receive the multiplexing scheme, spreading factor, or orthogonal cover set (or related parameters) from the base station 105 (e.g., in dedicated control signaling, RRC or other higher layer signaling, etc.) and/or may implicitly derive the multiplexing scheme, spreading factor, or orthogonal cover set (or related parameters) based on other configured or specified parameters.

At Block 412, the uplink communications can be transmitted in the slot based on the portion of the channel format. In an aspect, the communicating component 340 can, e.g., in conjunction with processor(s) 305, memory 302, and/or transceiver 370, transmit the uplink communications in the slot based on the portion of the channel format. For example, communicating component 340 can transmit the uplink communications according to the portion of the channel format to transmit DM-RS in designated symbols (e.g., in one or more slots) and corresponding data in other symbols (e.g., of the one or more slots). For example, this can include multiplexing the uplink communications and the DM-RS (e.g., at least in the time domain). For example, where configured, communicating component 340 can use the per symbol or multi-symbol multiplexing schemes in transmitting the uplink communications, perform intra-slot hopping where configured, etc. according to the portion of the channel format.

In one example, communicating component 340 can transmit different uplink communications with different performance targets based on the contents of the uplink data (e.g., the UE 115 can transmit acknowledgement (ACK) with higher performance target than channel quality indicator (CQI)). In this example, the different uplink communications may be separately encoded and transmitted using TDM. In this example, different uplink long bursts (e.g., different uplink channel durations) can be configured to control the performance target. Thus, in an example, the base station 105 can provide multiple uplink channel duration allocations to the UE 115 (e.g., for the same or different slots), and communicating component 340 can select an uplink channel duration (and corresponding channel format or portion of the format) to achieve the desired performance target.

In addition, in an example, UEs 115 may use different uplink channel durations, which may be allocated based at least on other parameters related to the UE 115, such as a UE's distance to the base station 105, a determined channel quality with the base station 105, etc. In this example, if per symbol multiplexing is enabled, UEs with different uplink channel durations may not overlap in channel allocation because the UEs may have different receive powers.

Also, in a specific example, the channel format and/or multiplexing scheme may be selected based on a Doppler mode at the UE 115 (e.g., in addition or alternatively to the payload size). For example, channel format component 342 can determine the Doppler mode at the UE 115 (e.g., as low or high Doppler, which may include comparing one or more associated parameters with one or more thresholds), and based on the Doppler mode, can determine the channel format and/or multiplexing scheme, where the channel format and associated multiplexing schemes can be different for different Doppler modes. For example, where channel format component 342 determines that the UE 115 is in a high Doppler mode and payload side is greater than y bits, channel format component 342 can determine to use the channel format 602, but with multiplexing scheme described with reference to channel format 604 (e.g., pre-DFT spreading for per symbol multiplexing or no multiplexing). In another example, where channel format component 342 determines that the UE 115 is in a low Doppler mode and payload side is greater than y bits, channel format component 342 can determine to use the channel format 604, and associated multiplexing schemes described above. Moreover, in an example, channel format component 342 may enable or disable intra-slot hopping based on the determined Doppler mode (and may accordingly select channel formats, or portions thereof, that do or do not support intra-slot hopping).

FIG. 5 illustrates a flow chart of an example of a method 500 for configuring (e.g., by a base station) uplink communications for a UE. In method 500, blocks indicated as dashed boxes may represent optional steps.

In method 500, at Block 502, a starting symbol and an ending symbol of an uplink channel duration can be indicated. In an aspect, the channel duration component 242 can, e.g., in conjunction with processor(s) 205, memory 202, transceiver 270 and/or scheduling component 240, indicate the starting symbol and the ending symbol of the uplink channel duration. For example, channel duration component 242 can indicate the uplink long burst duration for a given slot, which may include a number of consecutive symbols in the slot (e.g., 4 to 14 symbols, as described). Channel duration component 242 can specify the starting symbol and/or ending symbol (or a corresponding duration from the starting symbol) in an uplink resource grant signaled to the UE 115 in a dedicated control channel (e.g., PDCCH), in broadcast signaling, in higher layer signaling, such as RRC signaling, etc. As described above, the slot structure used in communications between the base station 105 and UE 115 can include large uplink portions or bursts (e.g., such as in slot structures 702, 706). Channel duration component 242 can accordingly indicate the slot structure to one or more UEs 115 to facilitate communicating with the one or more UEs 115.

In one example, scheduling component 240 can schedule different uplink channel durations for achieving different performance targets (e.g., transmit acknowledgement (ACK) with higher performance target than channel quality indicator (CQI)), as described. In this example, scheduling component 240 can indicate a slot structure or resource grant for one or more UEs 115 as including different uplink channel durations based on the data to be transmitted by the UE 115, the data to be associated with the uplink channel in the slot structure, etc. In addition, in an example, scheduling component 240 can schedule the UEs 115 with different uplink channel durations based on one or more parameters corresponding to the UE 115 and/or communications therewith. For example, scheduling component 240 can schedule the UEs 115 based on a UE's distance to the base station 105, a determined channel quality with the base station 105, etc.

In an example, in indicating the starting symbol and ending symbol of the uplink channel duration, scheduling component 240 may assign multiple UEs 115 with uplink channel durations in the same slot. Thus, for example, channel duration component 242 can indicate starting symbols and ending symbols (or corresponding durations) to each of multiple UEs 115. For example, the uplink channel durations may be contiguous, may overlap, etc. in the time domain. In this example, if per symbol multiplexing is enabled such that communications from multiple UEs 115 can be multiplexed and received by the base station 105 in the same symbol, UEs 115 with different uplink channel durations may not overlap in channel allocation because of different receive powers. In other words, the base station 105 may be able to differentiate signals received in the same symbol based on receive power of the signals. Thus, for example, scheduling component 240 can schedule UEs having varying distances to the base station 105 in the same slot. In this regard, for example, scheduling component 240 can schedule the uplink channel durations for the UEs to provide orthogonality between UEs with comparable receive powers.

In method 500, at Block 504, a channel format for receiving communications over an uplink channel during the uplink channel duration can be determined where the channel format is based on at least a payload size. In an aspect, the channel format component 244 can, e.g., in conjunction with processor(s) 205, memory 202, transceiver 270 and/or scheduling component 240, determine the channel format for receiving communications over the uplink channel during the uplink channel duration, where the channel format is based on at least the payload size. For example, channel format component 244 can select the channel format from one of multiple channel formats (e.g., channel formats 600, 602, 604) based on payload size of the uplink communications. In an example, channel format component 244 can determine the payload size based on receiving a buffer status report or other indication from the UE 115. In another example, the UE 115 can select the channel format based on payload size and can notify the base station 105 of the selection (e.g., over uplink control channel signaling, such as in an uplink short burst). In this example, the base station 105 can determine the channel format based at least in part on receiving the notification from the UE 115.

In method 500, at Block 506, uplink communications can be received according to the channel format and over the uplink channel during the uplink channel duration. In an aspect, the scheduling component 240 can, e.g., in conjunction with processor(s) 205, memory 202, and/or transceiver 270, can receive the uplink communications according to the channel format and over the uplink channel during the uplink channel duration. For example, as described, the UE 115 can transmit the uplink communications during the allocated channel duration (based on the starting symbol and ending symbol indicated at Block 502) based on the selected channel format. The base station 105 can receive the uplink communications knowing the selected channel format and indicated channel duration.

In method 500, optionally at Block 508, uplink data can be decoded based on DM-RS. In an aspect, the scheduling component 240 can, e.g., in conjunction with processor(s) 205, memory 202, and/or transceiver 270, can decode the uplink data based on the DM-RS. For example, the base station 105 can receive the DM-RS in the symbols based on the determined channel format, and can use the DM-RS to decode data in remaining symbols in the uplink channel duration. For example, base station 105 can use the DM-RS to perform channel estimation of the uplink channel over the symbols related to the received DM-RS.

Figure 9:
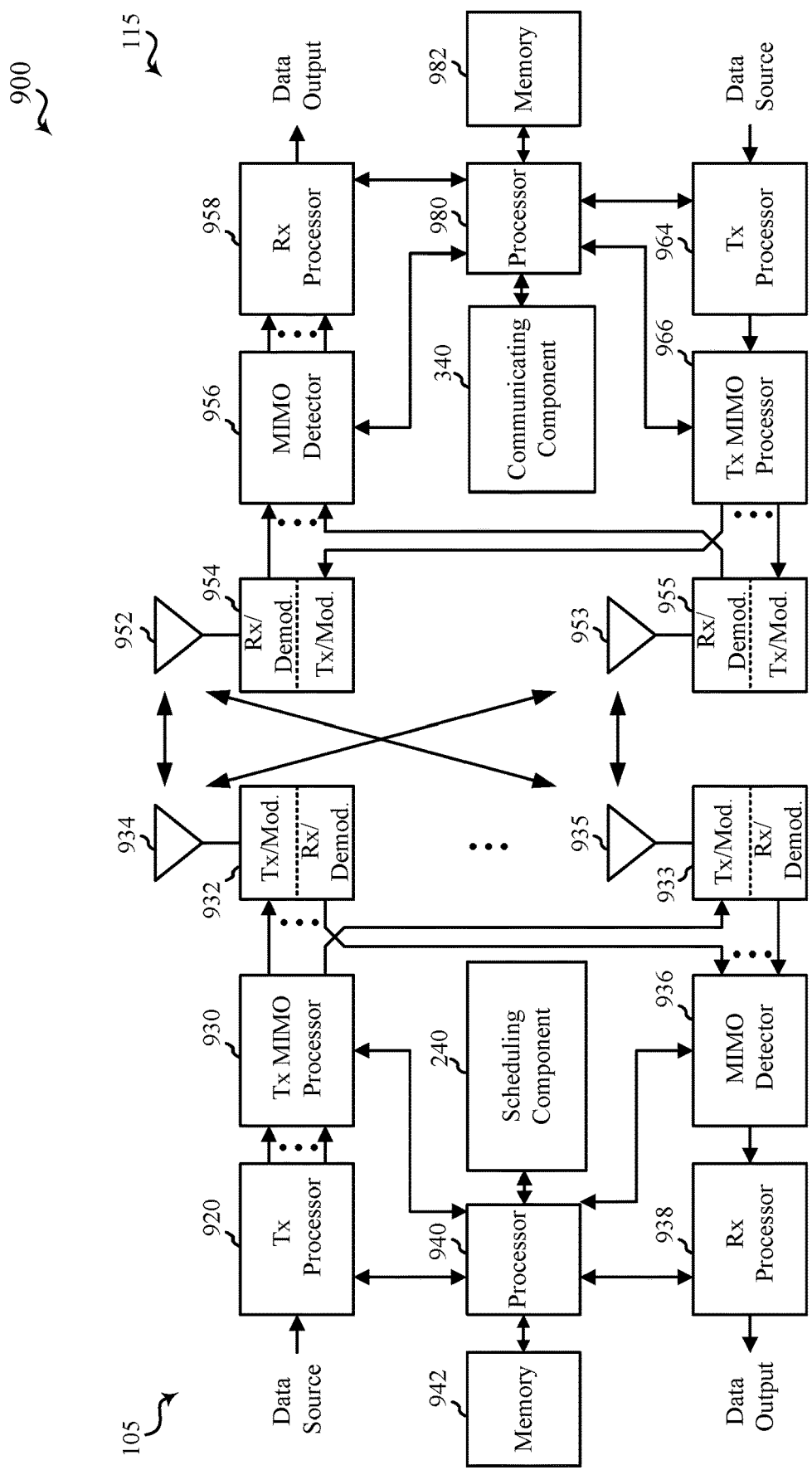
FIG. 9 is a block diagram illustrating an example of a MIMO communication system including a base station and a UE, in accordance with various aspects of the present disclosure.

FIG. 9 is a block diagram of a MIMO communication system 900 including a base station 105 and a UE 115. The MIMO communication system 900 may illustrate aspects of the wireless communication system 100 described with reference to FIG. 1. The base station 105 may be an example of aspects of the base station 105 described with reference to FIGS. 1-3. The base station 105 may be equipped with antennas 934 and 935, and the UE 115 may be equipped with antennas 952 and 953. In the MIMO communication system 900, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 115 may be an example of aspects of the UEs 115 described with reference to FIGS. 1-3. At the UE 115, the UE antennas 952 and 953 may receive the DL signals from the base station 105 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 115 to a data output, and provide decoded control information to a processor 980, or memory 982.

The processor 980 may in some cases execute stored instructions to instantiate a communicating component 340 (see e.g., FIGS. 1 and 3).

On the uplink (UL), at the UE 115, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the base station 105 in accordance with the communication parameters received from the base station 105. At the base station 105, the UL signals from the UE 115 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a scheduling component 240 (see e.g., FIGS. 1 and 2).

The components of the UE 115 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 900.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:
   determining a channel format of an uplink control channel for transmitting uplink communications in a slot based on an indication of the channel format received from a base station, wherein the channel format is based at least in part on a payload size of the uplink communications and based at least in part on an uplink channel duration for transmitting the uplink communications, wherein the channel format is determined from multiple channel formats defined for uplink control channels, wherein the channel format defines a pattern for transmitting a reference signal in at least a first one of multiple symbols in the slot and the uplink communications in at least a second one of the multiple symbols in the slot, and wherein the channel format defines the pattern as one of a first pattern based on frequency hopping being configured or a second pattern, different from the first pattern, based on frequency hopping not being configured;
   determining a starting symbol and an ending symbol of the uplink channel duration of the slot for transmitting the uplink communications;
   determining, based at least in part on the starting symbol and the ending symbol and based on the channel format, one or more symbols to utilize in transmitting the uplink communications in the slot; and
   transmitting, based on determining the one or more symbols, the uplink communications in the one or more symbols in the slot.

2. The method of claim 1, wherein the channel format is determined as being one of a first channel format of the multiple channel formats that corresponds to a first payload size, a second channel format of the multiple channel formats that corresponds to a second payload size, or a third channel format of the multiple channel formats that corresponds to a third payload size, wherein the first payload size is less than the second payload size, and the second payload size is less than the third payload size.

3. The method of claim 1, wherein the channel format defines the pattern, in at least a portion of the slot, of alternating reference signal (RS) symbols designated for demodulation reference signal (DM-RS) transmission and symbols designated for uplink data transmissions, wherein the alternating RS symbols are alternating in a time domain.

4. The method of claim 3, wherein the channel format is selected based on determining that the payload size of the uplink communications is one or two bits of uplink control data.

5. The method of claim 4, wherein the channel format indicates the starting symbol in the pattern as designated for DM-RS.

6. The method of claim 1, wherein the channel format defines the pattern of one or more reference signal (RS) symbols designated for demodulation reference signal (DM-RS) transmission, and wherein the channel format is determined to include at least one of the one or more RS symbols in the pattern.

7. The method of claim 6, wherein the channel format also indicates a hopping position corresponding to a symbol boundary at which to switch communication frequency.

8. The method of claim 1, wherein the each of the multiple channel formats define a fixed pattern of one or more reference signal (RS) symbols designated for demodulation reference signal (DM-RS) transmission and a hopping position corresponding to a symbol boundary at which to switch communication frequency.

9. The method of claim 1, further comprising determining, based at least in part on the starting symbol and the ending symbol, a spreading factor and/or an orthogonal cover set for transmitting the uplink communications.

10. The method of claim 9, wherein determining the spreading factor and/or the orthogonal cover set is further based at least in part on whether frequency hopping is configured.

11. The method of claim 1, wherein the channel format defines the pattern of three or four symbols designated for demodulation reference signal (DM-RS) transmission in the slot.

12. The method of claim 11, wherein the channel format defines the pattern of two symbols designated for demodulation reference signal (DM-RS) transmission in each half slot of the slot where frequency hopping is configured.

13. The method of claim 1, wherein the channel format defines the pattern of one or two symbols designated for demodulation reference signal (DM-RS) transmission in the slot.

14. The method of claim 13, wherein the channel format defines the pattern of one symbol designated for demodulation reference signal (DM-RS) transmission in each half slot of the slot where frequency hopping is configured.

15. The method of claim 1, wherein the channel format defines a fixed per symbol user multiplexing scheme and/or flexible multi-symbol user multiplexing schemes.

16. The method of claim 1, wherein determining the channel format and/or a multiplexing scheme for transmitting the uplink communications is further based at least in part on a Doppler mode.

17. The method of claim 1, wherein determining the channel format and/or whether to enable intra-slot frequency hopping is based at least in part on a Doppler mode or the payload size.

18. The method of claim 1, wherein determining the channel format is further based at least in part on determining whether the channel format includes at least one symbol designated for transmitting a demodulation reference signal (DM-RS).

19. An apparatus for wireless communication, comprising:
a transceiver for communicating one or more wireless signals via at least a transmitter and one or more antennas;
a memory configured to store instructions; and
one or more processors communicatively coupled with the transceiver and the memory, wherein the one or more processors are configured to:
determine a channel format of an uplink control channel for transmitting uplink communications in a slot based on an indication of the channel format received from a base station, wherein the channel format is based at least in part on a payload size of the uplink communications and based at least in part on an uplink channel duration for transmitting the uplink communications, wherein the channel format is determined from multiple channel formats defined for uplink control channels, wherein the channel format defines a pattern for transmitting a reference signal in at least a first one of multiple symbols in the slot and the uplink communications in at least a second one of the multiple symbols in the slot, and wherein the channel format defines the pattern as one of a first pattern based on frequency hopping being configured or a second pattern, different from the first pattern, based on frequency hopping not being configured;
determine a starting symbol and an ending symbol of an uplink channel duration of the slot for transmitting the uplink communications;
determine, based at least in part on the starting symbol and the ending symbol and based on the channel format, one or more symbols to utilize in transmitting the uplink communications in the slot; and
transmit, based on determining the one or more symbols, the uplink communications in the one or more symbols in the slot.

20. The apparatus of claim 19, wherein the channel format is determined as being one of a first channel format of the multiple channel formats that corresponds to a first payload size, a second channel format of the multiple channel formats that corresponds to a second payload size, or a third channel format of the multiple channel formats that corresponds to a third payload size, wherein the first payload size is less than the second payload size, and the second payload size is less than the third payload size.

21. The apparatus of claim 19, wherein the channel format defines the pattern, in at least a portion of the slot, of alternating reference signal (RS) symbols designated for demodulation reference signal (DM-RS) transmission and symbols designated for uplink data transmissions, wherein the alternating RS symbols are alternating in a time domain.

22. The apparatus of claim 21, wherein the channel format is selected based on determining that the payload size of the uplink communications is one or two bits of uplink control data.

23. The apparatus of claim 22, wherein the channel format indicates the starting symbol in the pattern as designated for DM-RS.

24. The apparatus of claim 19, wherein the channel format defines the pattern of one or more reference signal (RS) symbols designated for demodulation reference signal (DM-RS) transmission, and wherein the channel format is determined to include at least one of the one or more RS symbols in the pattern.

25. The apparatus of claim 24, wherein the channel format also indicates a hopping position corresponding to a symbol boundary at which to switch communication frequency.

26. The apparatus of claim 19, wherein the each of the multiple channel formats defines a fixed pattern of one or more reference signal (RS) symbols designated for demodulation reference signal (DM-RS) transmission and a hopping position corresponding to a symbol boundary at which to switch communication frequency.

27. The apparatus of claim 19, further comprising determining, based at least in part on the starting symbol and the ending symbol, a spreading factor and/or an orthogonal cover set for transmitting the uplink communications.

28. The apparatus of claim 19, wherein determining the channel format and/or a multiplexing scheme for transmitting the uplink communications is further based at least in part on a Doppler mode.

29. The apparatus of claim 19, wherein determining the channel format and/or whether to enable intra-slot frequency hopping is based at least in part on a Doppler mode or the payload size.

30. An apparatus for wireless communication, comprising:
- means for determining a channel format of an uplink control channel for transmitting uplink communications in a slot based on an indication of the channel format received from a base station, wherein the channel format is based at least in part on a payload size of the uplink communications and based at least in part on an uplink channel duration for transmitting the uplink communications, wherein the channel format is determined from multiple channel formats defined for uplink control channels, wherein the channel format defines a pattern for transmitting a reference signal in at least a first one of multiple symbols in the slot and the uplink communications in at least a second one of the multiple symbols in the slot, and wherein the channel format defines the pattern as one of a first pattern based on frequency hopping being configured or a second pattern, different from the first pattern, based on frequency hopping not being configured;
- means for determining a starting symbol and an ending symbol of an uplink channel duration of the slot for transmitting the uplink communications;
- means for determining, based at least in part on the starting symbol and the ending symbol and based on the channel format, one or more symbols to utilize in transmitting the uplink communications in the slot; and
- means for transmitting, based on determining the one or more symbols, the uplink communications in the one or more symbols in the slot.

31. The apparatus of claim 30, wherein the channel format is determined as being one of a first channel format of the multiple channel formats that corresponds to a first payload size, a second channel format of the multiple channel formats that corresponds to a second payload size, or a third channel format of the multiple channel formats that corresponds to a third payload size, wherein the first payload size is less than the second payload size, and the second payload size is less than the third payload size.

32. The apparatus of claim 30, wherein the channel format defines the pattern, in at least a portion of the slot, of alternating reference signal (RS) symbols designated for demodulation reference signal (DM-RS) transmission and symbols designated for uplink data transmissions, wherein the alternating RS symbols are alternating in a time domain.

33. The apparatus of claim 32, wherein the channel format is selected based on determining that the payload size of the uplink communications is one or two bits of uplink control data.

34. The apparatus of claim 33, wherein the channel format indicates the starting symbol in the pattern as designated for DM-RS.

35. The apparatus of claim 30, wherein the channel format defines the pattern of one or more reference signal (RS) symbols designated for demodulation reference signal (DM-RS) transmission, and wherein the channel format is determined to include at least one of the one or more RS symbols in the pattern.

36. The apparatus of claim 30, wherein the each of the multiple channel formats define a fixed pattern of one or more reference signal (RS) symbols designated for demodulation reference signal (DM-RS) transmission and a hopping position corresponding to a symbol boundary at which to switch communication frequency.

37. A non-transitory computer-readable medium, comprising code executable by one or more processors for wireless communication, the code comprising:
- code for determining a channel format of an uplink control channel for transmitting uplink communications in a slot based on an indication of the channel format received from a base station, wherein the channel format is based at least in part on a payload size of the uplink communications and based at least in part on an uplink channel duration for transmitting the uplink communications, wherein the channel format is determined from multiple channel formats defined for uplink control channels, wherein the channel format defines a pattern for transmitting a reference signal in at least a first one of multiple symbols in the slot and the uplink communications in at least a second one of the multiple symbols in the slot, and wherein the channel format defines the pattern as one of a first pattern based on frequency hopping being configured or a second pattern, different from the first pattern, based on frequency hopping not being configured;
- code for determining a starting symbol and an ending symbol of an uplink channel duration of the slot for transmitting the uplink communications;
- code for determining, based at least in part on the starting symbol and the ending symbol and based on the channel format, one or more symbols to utilize in transmitting the uplink communications in the slot; and
- code for transmitting, based on determining the one or more symbols, the uplink communications in the one or more symbols in the slot.

38. The non-transitory computer-readable medium of claim 37, wherein the channel format is determined as being one of a first channel format of the multiple channel formats that corresponds to a first payload size, a second channel format of the multiple channel formats that corresponds to a second payload size, or a third channel format of the multiple channel formats that corresponds to a third payload size, wherein the first payload size is less than the second payload size, and the second payload size is less than the third payload size.

39. The non-transitory computer-readable medium of claim 37, wherein the channel format defines the pattern, in at least a portion of the slot, of alternating reference signal (RS) symbols designated for demodulation reference signal (DM-RS) transmission and symbols designated for uplink data transmissions, wherein the alternating RS symbols are alternating in a time domain.

40. The non-transitory computer-readable medium of claim 39, wherein the channel format is selected based on determining that the payload size of the uplink communications is one or two bits of uplink control data.

41. The non-transitory computer-readable medium of claim 40, wherein the channel format indicates the starting symbol in the pattern as designated for DM-RS.

42. The non-transitory computer-readable medium of claim 37, wherein the channel format defines the pattern of one or more reference signal (RS) symbols designated for demodulation reference signal (DM-RS) transmission, and wherein the channel format is determined to include at least one of the one or more RS symbols in the pattern.

43. The non-transitory computer-readable medium of claim 37, wherein the each of the multiple channel formats define a fixed pattern of one or more reference signal (RS) symbols designated for demodulation reference signal (DM-RS) transmission and a hopping position corresponding to a symbol boundary at which to switch communication frequency.

44. A method for wireless communication, comprising:
indicating an uplink channel duration for transmitting communications over an uplink channel;
determining a channel format of an uplink control channel for transmitting the communications over the uplink channel during the uplink channel duration in a slot, wherein the channel format is one of multiple channel formats defined for uplink control channels and is determined based on at least a payload size of the communications and the uplink channel duration, wherein the channel format defines a pattern for transmitting a reference signal in at least a first one of multiple symbols in the slot and the uplink communications in at least a second one of the multiple symbols in the slot, and wherein the channel format defines the pattern as one of a first pattern based on frequency hopping being configured or a second pattern, different from the first pattern, based on frequency hopping not being configured;
transmitting an indication of the channel format to use for transmitting communications over the uplink channel; and
receiving, based on transmitting the indication of the channel format, uplink communications according to the channel format and over the uplink channel during the uplink channel duration.

45. The method of claim 44, wherein a first channel format of the multiple channel formats corresponds to a first payload size and indicates a first fixed pattern of alternating reference signal (RS) symbols designated for demodulation reference signal (DM-RS) transmission in each half slot of the slot,
wherein a second channel format of the multiple channel formats corresponds to a second payload size and indicates a second fixed pattern of three or four RS symbols designated for DM-RS transmission in the slot,
wherein a third channel format of the multiple channel formats corresponds to a third payload size and indicates a third fixed pattern of one or two RS symbols designated for DM-RS transmission in the slot, and
wherein the first payload size is less than the second payload size, and the second payload size is less than the third payload size.

46. An apparatus for wireless communication, comprising:
a transceiver for communicating one or more wireless signals via at least a transmitter and one or more antennas;
a memory configured to store instructions; and
one or more processors communicatively coupled with the transceiver and the memory, wherein the one or more processors are configured to:
indicate an uplink channel duration for transmitting communications over an uplink channel;
determine a channel format of an uplink control channel for transmitting the communications over the uplink channel during the uplink channel duration in a slot, wherein the channel format is one of multiple channel formats defined for uplink control channels and is determined based on at least a payload size of the communications and the uplink channel duration, wherein the channel format defines a pattern for transmitting a reference signal in at least a first one of multiple symbols in the slot and the uplink communications in at least a second one of the multiple symbols in the slot, and wherein the channel format defines the pattern as one of a first pattern based on frequency hopping being configured or a second pattern, different from the first pattern, based on frequency hopping not being configured;
transmit an indication of the channel format to use for transmitting communications over the uplink channel; and
receive, based on transmitting the indication of the channel format, uplink communications according to the channel format and over the uplink channel during the uplink channel duration.

47. The apparatus of claim 46, wherein a first channel format of the multiple channel formats corresponds to a first payload size and indicates a first fixed pattern of alternating reference signal (RS) symbols designated for demodulation reference signal (DM-RS) transmission in each half slot of the slot,
wherein a second channel format of the multiple channel formats corresponds to a second payload size and indicates a second fixed pattern of three or four RS symbols designated for DM-RS transmission in the slot,
wherein a third channel format of the multiple channel formats corresponds to a third payload size and indicates a third fixed pattern of one or two RS symbols designated for DM-RS transmission in the slot, and
wherein the first payload size is less than the second payload size, and the second payload size is less than the third payload size.

48. An apparatus for wireless communication, comprising:
means for indicating an uplink channel duration for transmitting communications over an uplink channel;
means for determining a channel format of an uplink control channel for transmitting the communications over the uplink channel during the uplink channel duration in a slot, wherein the channel format is one of multiple channel formats defined for uplink control channels and is determined based on at least a payload size of the communications and the uplink channel duration, wherein the channel format defines a pattern for transmitting a reference signal in at least a first one of multiple symbols in the slot and the uplink communications in at least a second one of the multiple symbols in the slot, and wherein the channel format defines the pattern as one of a first pattern based on frequency hopping being configured or a second pattern, different from the first pattern, based on frequency hopping not being configured;
means for transmitting an indication of the channel format to use for transmitting communications over the uplink channel; and
means for receiving, based on transmitting the indication of the channel format, uplink communications according to the channel format and over the uplink channel during the uplink channel duration.

49. The apparatus of claim 48, wherein a first channel format of the multiple channel formats corresponds to a first payload size and indicates a first fixed pattern of alternating reference signal (RS) symbols designated for demodulation reference signal (DM-RS) transmission in each half slot of the slot,
wherein a second channel format of the multiple channel formats corresponds to a second payload size and indicates a second fixed pattern of three or four RS symbols designated for DM-RS transmission in the slot, wherein a third channel format of the multiple channel formats corresponds to a third payload size and indicates a third fixed pattern of one or two RS symbols designated for DM-RS transmission in the slot, and wherein the first payload size is less than the second payload size, and the second payload size is less than the third payload size.

50. A non-transitory computer-readable medium, comprising code executable by one or more processors for wireless communication, the code comprising:

code for indicating an uplink channel duration for transmitting communications over an uplink channel;

code for determining a channel format of an uplink control channel for transmitting communications over the uplink channel during the uplink channel duration in a slot, wherein the channel format is one of multiple channel formats defined for uplink control channels and is determined based on at least a payload size of the communications and the uplink channel duration, wherein the channel format defines a pattern for transmitting a reference signal in at least a first one of multiple symbols in the slot and the uplink communications in at least a second one of the multiple symbols in the slot, and wherein the channel format defines the pattern as one of a first pattern based on frequency hopping being configured or a second pattern, different from the first pattern, based on frequency hopping not being configured;

code for transmitting an indication of the channel format to use for transmitting communications over the uplink channel; and code for receiving, based on transmitting the indication of the channel format, uplink communications according to the channel format and over the uplink channel during the uplink channel duration.

51. The non-transitory computer-readable medium of claim 50, wherein a first channel format of the multiple channel formats corresponds to a first payload size and indicates a first fixed pattern of alternating reference signal (RS) symbols designated for demodulation reference signal (DM-RS) transmission in each half slot of the slot, wherein a second channel format of the multiple channel formats corresponds to a second payload size and indicates a second fixed pattern of three or four RS symbols designated for DM-RS transmission in the slot, wherein a third channel format of the multiple channel formats corresponds to a third payload size and indicates a third fixed pattern of one or two RS symbols designated for DM-RS transmission in the slot, and wherein the first payload size is less than the second payload size, and the second payload size is less than the third payload size.

* * * * *